(No Model.)
P. B. SULLIVAN.
SAFETY DEVICE FOR ELEVATORS.
No. 402,780. Patented May 7, 1889.
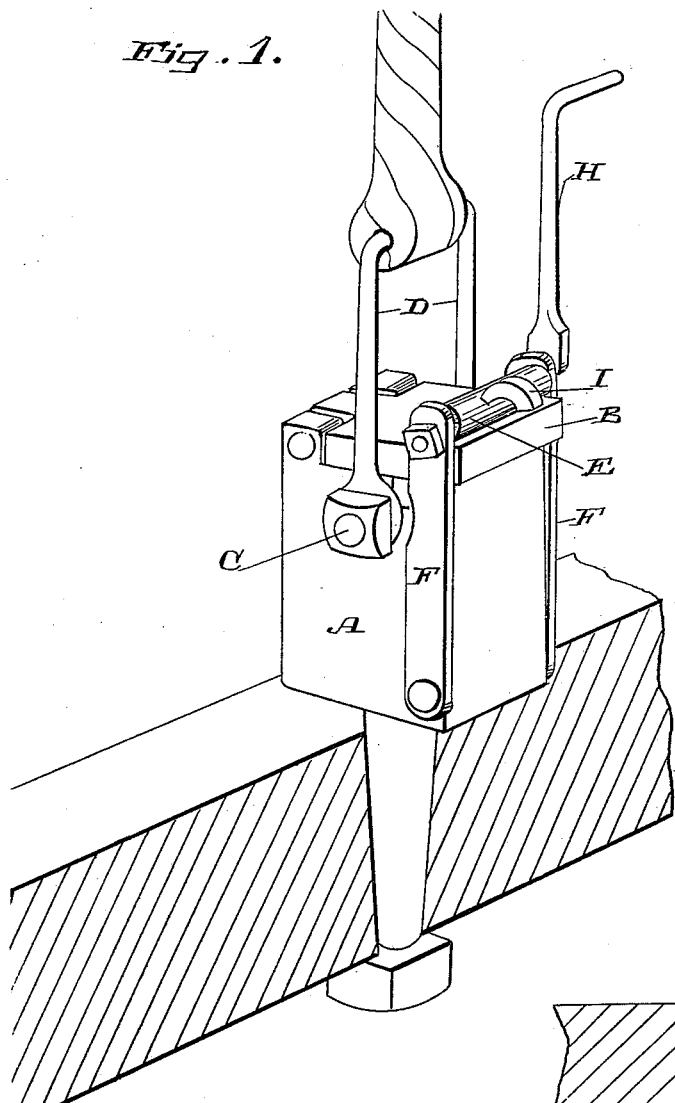
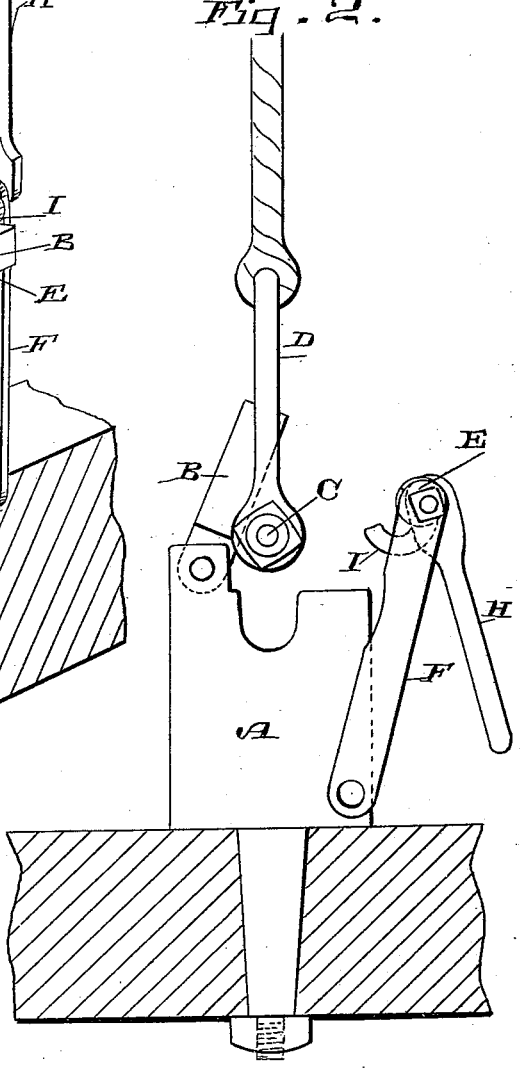
Witnesses,
Geo. H. Strong
J. H. Nurse
Inventor,
Philip B. Sullivan
By Dewey & Co.
Atty.

UNITED STATES PATENT OFFICE.

PHILIP B. SULLIVAN, OF TUSCARORA, NEVADA.

SAFETY DEVICE FOR ELEVATORS.

SPECIFICATION forming part of Letters Patent No. 402,780, dated May 7, 1889.

Application filed October 20, 1888. Serial No. 288,698. (No model.)

*To all whom it may concern:*

Be it known that I, PHILIP B. SULLIVAN, of Tuscarora, Elko county, State of Nevada, have invented an Improvement in Safety-Hooks for Elevator-Cages; and I hereby declare the following to be a full, clear, and exact description of the same.

My invention relates to a novel safety-hook for elevators or cages for mines or buildings, and is designed to prevent the cage from running up into the cable-sheave by releasing it before it reaches that point. The safety-clutches act to hold the cage and prevent it from falling.

My invention consists of a hinged plate by which the clevis to which the rope is attached is connected with the suspending-bar at the top of the cage, and in connection with this of an eccentric which locks the hinged plate, and has an arm or lever projecting from it, so that it may engage a projection upon the frame-work or guides and release the holding-plate, so as to let the clevis and the cable go free while the clutches on the cage will set and stop it.

Referring to the accompanying drawings for a more complete explanation of my invention, Figure 1 is a perspective view of the suspending-bar, the clevis, and the hinged plate and eccentric which hold it in place. Fig. 2 shows the device detached so as to let the clevis go.

A is the bar or strap which is fixed to the top of the cage, and which serves for the attachment of the cable by which the cage is suspended and operated. The part A may be made in various ways; but in the present case I have shown it as a solid bar having a shank which extends through the upper timber of the cage, and is secured thereto by a nut or other suitable means.

Upon the top of the bar A is hinged a plate, B, and transversely across the upper end of the bar A, and at one side of the hinge of the plate B, is formed a channel or groove, in which the pin or bolt C lies. The clevis D, to which the rope is attached, has its ends fitted to this bolt, and when the bolt has been laid into the groove or channel and the plate B turned down over it this plate will lock and hold the clevis-bolt in its place.

In order to hold down the edge of the plate which is opposite to the hinge, I employ an eccentric-roller, E, which is journaled in the upper ends of the links F. The lower ends of these links are pivoted to the lower part of the bar A, so that they may swing outward and inward upon each side of the plate B. It will be manifest that when the links are swung inward, so that the eccentric E lies above the free or swinging edge of the plate B the whole will be held down by this eccentric upon one side and its hinge upon the opposite side, so that the clevis and its bolt cannot be withdrawn from the suspending-bar A.

Upon one end of the shaft of the eccentric E is fixed a lever-arm, H, which projects outwardly therefrom, and is so arranged that when the cage rises above the desired point, or if by accident it should be allowed to run upward so as to be in danger of running into the cable-sheaves above, this lever-arm would strike a projection fastened to the gallows frame or timbers of the elevator-shaft, and the eccentric would then be turned round by its action. A spur or stud, I, projects from the eccentric, so that when the lever-arm H is moved, as above described, so as to turn the eccentric, this spur striking against the edge of the plate B will force the eccentric away from the plate, causing it to swing about the fulcrum-points of the arms F until it is free from the plate, as shown in Fig. 2, when the weight of the cage upon the suspending-rope causes the clevis-bolt to be pulled out of its channel, the hinge-plate B opening, thus allowing the cage to be freed entirely from its suspending-rope. When this is done, the safety-clutches upon the cage are depended upon to check and hold the cage and prevent its falling.

Having thus described my invention, what I claim as new, and desire to secure by Letters Patent, is—

The suspending-bar of an elevator-cage, having its upper end channeled to receive the bolt of the cable-clevis, a hinged plate which shuts down over the bolt to retain it in place, in combination with an eccentric locking-bar journaled in swinging arms, so as to engage the edge of the hinged plate to hold it in place, a lever projecting from the end of the eccentric-shaft, and a spur or stud, which, when the eccentric is rotated, will force the eccentric outward and release the hinged plate, substantially as herein described.

In witness whereof I have hereunto set my hand.

PHILIP B. SULLIVAN.

Witnesses:
 HARRY PARKER,
 THOS. F. BRENNAN.